United States Patent
Barkalow et al.

(10) Patent No.: US 6,444,240 B1
(45) Date of Patent: Sep. 3, 2002

(54) COATING PROCESS APPLYING A SUSPENSION SYRUP WITH A COMBINATION OF HYDROGENATED ISOMALTULOSE MATERIALS

(75) Inventors: David G. Barkalow, Deerfield; Lindell C. Richey, Lake Zurich; Julius W. Zuehlke, Chicago, all of IL (US)

(73) Assignee: Wm. Wrigley Jr. Company, Chicago, IL (US)

(*) Notice: Subject to any disclaimer, the term of this patent is extended or adjusted under 35 U.S.C. 154(b) by 0 days.

(21) Appl. No.: 09/648,218

(22) Filed: Aug. 25, 2000

Related U.S. Application Data

(60) Provisional application No. 60/151,500, filed on Aug. 30, 1999.

(51) Int. Cl.$^7$ .............................. A23G 3/00; A23G 3/30
(52) U.S. Cl. .............................................. 426/5; 426/660
(58) Field of Search .......................... 426/3, 5, 660

(56) References Cited

U.S. PATENT DOCUMENTS

| | | | | |
|---|---|---|---|---|
| 4,105,801 A | * | 8/1978 | Dogliotti | 426/99 |
| 4,127,677 A | * | 11/1978 | Fronczowski et al. | 426/5 |
| 4,238,510 A | * | 12/1980 | Cherukuri et al. | 426/5 |
| 4,250,195 A | * | 2/1981 | Cherukuri et al. | 426/5 |
| 4,317,838 A | * | 3/1982 | Cherukuri et al. | 426/5 |
| 4,423,086 A | * | 12/1983 | Devos et al. | 427/3 |
| 4,671,967 A | * | 6/1987 | Patel et al. | 426/658 |
| 4,681,766 A | * | 7/1987 | Huzinec et al. | 426/5 |
| 4,753,790 A | * | 6/1988 | Silva et al. | 424/440 |
| 4,786,511 A | * | 11/1988 | Huzinec et al. | 426/5 |
| 4,792,453 A | * | 12/1988 | Reed et al. | 426/5 |
| 4,828,845 A | * | 5/1989 | Zamudio-Tena et al. | 426/5 |
| 4,840,797 A | * | 6/1989 | Boursier | 424/475 |
| 4,961,935 A | * | 10/1990 | Cherukuri et al. | 426/3 |
| 5,248,508 A | * | 9/1993 | Reed et al. | 426/5 |
| 5,270,061 A | * | 12/1993 | Reed et al. | 426/5 |
| 5,478,593 A | * | 12/1995 | Serpellioni et al. | 426/303 |
| 5,527,542 A | * | 6/1996 | Serpellioni et al. | 424/488 |
| 5,536,511 A | * | 7/1996 | Yatka | 426/5 |
| 5,571,547 A | * | 11/1996 | Serpellioni et al. | 426/103 |
| 5,578,339 A | * | 11/1996 | Kunz et al. | 426/658 |
| 5,603,970 A | * | 2/1997 | Tyrpin et al. | 426/5 |
| 5,665,406 A | * | 9/1997 | Reed et al. | 426/5 |
| 5,716,652 A | * | 2/1998 | Barkalow et al. | 426/5 |
| 5,952,019 A | * | 9/1999 | Yatka et al. | 426/3 |

FOREIGN PATENT DOCUMENTS

| | | |
|---|---|---|
| EP | 0 630 575 | 11/1994 |
| GB | 2115672 | 9/1983 |
| JP | 94-292511 | 10/1994 |
| JP | 95-055898 | 6/1995 |
| WO | WO 91/09989 | 7/1991 |
| WO | WO 95/07622 | 3/1995 |
| WO | WO 95/08926 | 4/1995 |
| WO | WO 97/08958 | 3/1997 |
| WO | WO 97/16074 | 5/1997 |
| WO | WO 97/45021 | 12/1997 |
| WO | WO 98/12933 | 4/1998 |

OTHER PUBLICATIONS

INFOPAC, Bud Richey, article titled "Isomalt" by PALATINIT® SuBungsnmittel GmbH (undated) (published at least before Aug. 5, 1999), 2 pages.

Silesia, article titled Silesia Confiserie Manual No. 4—Special Manual for Pan Coating Technology Coating Systems for Snacks (Pharmaceutical Dragees), published by Silesia Gerhard Hanke KG, Abt. Fachbucherie, Germany 1996, 6 pages.

Hawley, The Condensed Chemical Dictionary, ninth ed., definition of "Suspension", 1977, 1 page.

\* cited by examiner

*Primary Examiner*—Arthur L. Corbin
(74) *Attorney, Agent, or Firm*—Steven P. Shurtz; Brinks Hofer Gilson & Lione

(57) ABSTRACT

A method of coating comestibles comprises the steps of providing cores of comestibles to be coated; applying a coating syrup to the cores to build up a layer of coating on the cores; the coating syrup comprising a suspension made from a liquid solution of hydrogenated isomaltulose that is enriched to contain an excess of alpha-D-glucopyranosido-1,6-sorbitol (GPS) compared to alpha-D-glucopyranosido-1,1-mannitol (GPM) and a powder solid phase hydrogenated isomaltulose that is not enriched in GPS compared to GPM.

22 Claims, No Drawings

US 6,444,240 B1

COATING PROCESS APPLYING A SUSPENSION SYRUP WITH A COMBINATION OF HYDROGENATED ISOMALTULOSE MATERIALS

REFERENCE TO EARLIER FILED APPLICATION

The present application claims the benefit of the filing date under 35 U.S.C. §119(e) of Provisional U.S. patent application Ser. No. 60/151,500, filed Aug. 30, 1999, which is incorporated herein by reference.

BACKGROUND OF THE INVENTION

This invention relates to a chewing gum product or other comestible with a coating thereon, and in particular to sugarless chewing gum products with a hard coating comprising hydrogenated isomaltulose, and methods of making such products.

Chewing gums, including pellet chewing gums, are frequently enclosed with hard or soft coatings. Coatings provide an opportunity for the manufacturer to vary product characteristics such as taste, appearance and nutritional value. In recent years, efforts have been devoted to producing sugarless hard coatings for use on chewing gum. Sugarless coatings which have been investigated include coatings containing compounds such as xylitol, sorbitol, maltitol and hydrogenated isomaltulose.

Conventional coating processes for polyols use either an aqueous liquid addition of the polyol, followed by drying, or an aqueous liquid addition plus a dry charge with the polyol, followed by drying.

Sugarless xylitol coated pellet gums have become very popular and products are being manufactured in Europe and Canada. Coating with xylitol is described in U.S. Pat. No. 4,105,801, issued Aug. 8, 1978, to Dogliotti; U.S. Pat. No. 4,127,677, issued Nov. 28, 1978, to Fronczowski et al.; U.S. Pat. No. 4,681,766, issued Jul. 21, 1987 and U.S. Pat. No. 4,786,511, issued Nov. 22, 1988, to Huzinec et al.; and U.S. Pat. No. 4,828,845, issued May 9, 1989, to Zamudio-Tena et al.

The most common and lowest costing polyol used in chewing gum is sorbitol. However, panning with sorbitol has been very difficult since it is hygroscopic and does not readily crystallize. A number of patents have been published that use various procedures to coat with sorbitol, including U.K. Patent No. 2,115,672; U.S. Pat. No. 4,317,838; and U.S. Pat. No. 4,753,790. A successful sorbitol hard coating was reported in U.S. Pat. No. 4,423,086, particularly when the sorbitol was at least 99% D-sorbitol. However, the quality of coating never approached the quality of typical xylitol hard coatings.

Another coating patent, U.S. Pat. No. 4,840,797, discloses the use of maltitol in a coating. Again, a high purity in the maltitol (over 95%) was required in order to obtain a good quality coating on pellet gum. Also hydrogenated isomaltulose is disclosed as a coating material or gum ingredient in PCT Patent Publications Nos. WO98/12933; WO97/45021; WO97/16074; WO97/08958; WO95/08926 and WO95/07622; U.S. Pat. Nos. 5,716,652; 5,665,406; 5,578,339; 5,571,547; 5,527,542; 5,478,593; 5,270,061; 5,248,508; 4,961,935; 4,840,797; 4,792,453 and 4,317,838; Japanese Patent Publications Nos. 95-055898 and 94-292511; and EPO Patent Publication No. 0630575.

In many of the coating processes, the liquid polyol may become tacky when it is applied to the coating bed and begins to dry. To reduce tack, the powdered polyol is applied to quickly dry the coating before it becomes too tacky. This is commonly referred to as dry charging. When a large amount of dry powder is added to a liquid mixture to help dry the coating, a soft shell results and is sometimes called soft panning. When hot liquid syrups containing pure polyols are used and dried with air, crystals are formed that are hard and crunchy. This is called hard panning. Sometimes dry charging can be used in hard panning, but is usually very limited in the amount of dry charge material, either by being used for a few applications during the process, or by using a low amount of dry charge material per application.

One of the difficulties with forming a quality coating is that it takes a long time to apply and dry the multiple coats of liquid used to build up the coating on the product. The use of a dry charge helps build up the coating quickly, thus reducing manufacturing time, but generally makes it more difficult to get a high quality coating, and particularly a hard crunchy coating, with good appearance. This has been particularly true when hydrogenated isomaltulose is used to create a coating on a chewing gum pellet. Other polyols such as xylitol can be used to coat pellets in about 2–4 hours in a side vented pan. Hydrogenated isomaltulose coating takes about 5–6 hours for the same production size of batch using the same production equipment. Therefore it would be a great improvement to be able to apply a hydrogenated isomaltulose coating on a product in a reduced amount of time, yet having a high quality appearance.

BRIEF SUMMARY OF THE INVENTION

A process has been discovered for coating chewing gum that results in a good quality hydrogenated isomaltulose coating in a significantly reduced amount of coating time.

In a first aspect, the invention is a method of coating comestibles comprising the steps of: a) providing cores of comestible material to be coated; b) applying a coating syrup comprising a suspension of i) an aqueous solution of hydrogenated isomaltulose enriched in alpha-D-glucopyranosido-1,6-sorbitol (GPS) compared to alpha-D-glucopyranosido-1,1-mannitol (GPM) and ii) a powder of hydrogenated isomaltulose that is not enriched in GPS compared to GPM to the cores; c) evaporating water from the applied coating syrup; and d) repeating steps b) and c) to build up a layer of coating on the cores.

In a second aspect, the invention is a method of coating comestibles comprising the steps of: a) providing cores of comestible material to be coated; b) applying a first coating syrup to the cores; c) applying a powder material over the first coating syrup; d) repeating steps b) and c) to build up a first layer of coating on the cores; e) wherein the first coating syrup is a suspension made from: i) a solution of hydrogenated isomaltulose that is enriched in containing an excess amount of alpha-D-glucopyranosido-1,6-sorbitol (GPS) compared to alpha-D-glucopyranosido-1, 1 -mannitol (GPM) and ii) a powder forming a solid suspension in the syrup, the powder comprising hydrogenated isomaltulose that is not enriched in GPS compared to GPM.

In a third aspect, the invention is a method of coating comestibles comprising the steps of: a) providing cores of comestible material to be coated; b) applying a first coating syrup to cover the cores, the syrup comprising between about 0.5% and about 10% of a binding agent and a suspension of i) an aqueous solution of hydrogenated isomaltulose that has both GPS and GPM, with a ratio of GPS to GPM of between about 99:1 and about 60:40 and ii) a powder of hydrogenated isomaltulose suspended in the solution, the powder having both GPS and GPM, with the amount of GPS not exceeding the amount of GPM; c) applying a second powdered material over the first coating syrup, the second powdered material comprising hydrogenated isomaltulose; d) repeating steps b) and c) to build up a first layer of coating on the cores; and e) applying the first coating syrup over the first layer of coating without applying the powdered material between applications of coating syrup, and drying the coating syrup to form a second coating layer on the cores.

As explained more fully below, it has been found that using a suspension syrup made from a solution of hydrogenated isomaltulose enriched in GPS and a powder of a hydrogenated isomaltulose that is not enriched has surprisingly been found to produce a better coating than a coatings made with suspensions where either both the solution and the powder are enriched or both the solution and powder are not enriched.

DETAILED DESCRIPTION OF THE PREFERRED EMBODIMENTS OF THE INVENTION

All percentages herein are weight percentages unless otherwise specified. The term "chewing gum" also includes bubble gum and the like.

Commercially, hydrogenated isomaltulose, also called Palatinit and Isomalt, is available from Palatinit Susungsmittel GmbH, a division of Sudzucker Aktiengesellschaft of Germany. Hydrogenated isomaltulose is a racemic mixture of alpha-D-glucopyranosido-1,6-sorbitol (GPS) and alpha-D-glucopyranosido-1,1-mannitol (GPM), which is sold as ISOMALT ST. This hydrogenated isomaltulose has an essentially equal amount of GPS and GPM. PCT Patent Publication No. WO 97/08958 discloses materials which are made by enriching mixtures of GPS and GPM with respect to one or the other of the isomers. As used herein and in the claims, the term "enriched" means that the ratio of GPS to GPM in the hydrogenated isomaltulose is different than that of a racemic mixture of GPS and GPM found in a typical hydrogenated isomaltulose. Palatinit Susungsmittel GmbH currently produces an enriched GPS hydrogenated isomaltulose (80:20 mix of GPS/GPM) called ISOMALT GS. According to prior art, since GPS is more water soluble, solution kinetics for coating are improved, along with an improved coating shelf life.

In the present invention, pellet or ball gum is prepared as conventional chewing gum, but formed into pellets that are pillow shaped or into balls. The pellets/balls can then be coated or panned to make coated pellet gum. The weight of the coating may be about 20% to about 50% of the weight of the finished gum product.

Conventional panning procedures generally coat with sucrose, but recent advances in panning have allowed the use of other carbohydrate materials to be used in the place of sucrose. Some of these components include, but are not limited to, dextrose, maltose, xylitol, hydrogenated isomaltulose and other new polyols or a combination thereof. These materials may be blended with panning modifiers including, but not limited to, gum arabic, maltodextrins, corn syrup, gelatin, cellulose type materials like carboxymethyl cellulose or hydroxymethyl cellulose, starch and modified starches, vegetable gums like alginates, locust bean gum, guar gum and gum tragacanth, insoluble carbonates like calcium carbonate or magnesium carbonate, and talc. Antitack agents may also be added as panning modifiers, which allow the use of a variety of carbohydrates and sugar alcohols to be used in the development of new panned or coated gum products.

Chewing gum products of the present invention may be made with a variety of chewing gum pellet compositions. In general, a chewing gum composition typically contains a chewable gum base portion which is essentially free of water and is water-insoluble, a water-soluble bulk portion and flavors which are typically water insoluble. The water-soluble portion dissipates with a portion of the flavor over a period of time during chewing. The gum base portion is retained in the mouth throughout the chew.

The insoluble gum base generally comprises elastomers, elastomer solvents, plasticizers, waxes, emulsifiers and inorganic fillers. Plastic polymers, such as polyvinyl acetate, which behave somewhat as plasticizers, are also often included. Other plastic polymers that may be used include polyvinyl laurate, polyvinyl alcohol and polyvinyl pyrrolidone.

Elastomers may include polyisobutylene, butyl rubber, (isobutylene-isoprene copolymer) and styrene butadiene rubber, as well as natural latexes such as chicle. Elastomer solvents are often resins such as terpene resins. Plasticizers, sometimes called softeners, are typically fats and oils, including tallow, hydrogenated and partially hydrogenated vegetable oils, and coca butter. Commonly employed waxes include paraffin, microcrystalline and natural waxes such as beeswax and carnauba. Microcrystalline waxes, especially those with a high degree of crystallinity, may be considered bodying agents or textural modifiers.

The gum base typically also includes a filler component. The filler component may be calcium carbonate, magnesium carbonate, talc, dicalcium phosphate or the like. The filler may constitute between about 5% and about 60% of the gum base. Alternatively, the filler may comprise about 5% to about 50% of the gum base.

Emulsifiers, which sometimes also have plasticizing properties, include glycerol monostearate, lecithin and glycerol triacetate. Further, gum bases may also contain optional ingredients such as antioxidants, colors and flavors.

The insoluble gum base may constitute between about 5% to about 95% of the gum. Typically, the insoluble gum base may comprise between about 10% and about 50% of the gum, or from about 20% to about 40% of the gum. The present invention contemplates employing any commercially acceptable gum base. The water-soluble portion of the chewing gum may further comprise softeners, sweeteners, flavoring agents and combinations thereof. The sweeteners often fulfill the role of bulking agents in the gum. The bulking agents typically comprise about 5% to about 95% of the gum composition.

Softeners are added to the chewing gum in order to optimize the chewability and mouth feel of the gum. Softeners, also known in the art as plasticizers or plasticizing agents, generally constitute between about 0.5% to about 15% of the chewing gum. Softeners contemplated by the present invention include glycerin, lecithin and combinations thereof. Further, aqueous sweetener solutions such as those containing sorbitol, hydrogenated starch hydrolysate, corn syrup and combinations thereof may be used as softeners and binding agents in gum.

As mentioned above, the coating of the present invention will most commonly be used on sugar-free gum formulations. However, sugar-gum formulations may also use a hard coating of the present invention. Sugar sweeteners generally include saccharide-containing components commonly known in the chewing gum art which comprise, but are not limited to, sucrose, dextrose, maltose, dextrin, dried invert sugar, fructose, levulose, galactose, corn syrup solids and the like, alone or in any combination. Generally sugarless sweeteners include components with sweetening characteristics but which are devoid of the commonly known sugars and comprise, but are not limited to, sugar alcohols such as sorbitol, mannitol, xylitol, hydrogenated starch hydrolysate, maltitol, hydrogenated isomaltulose and the like, alone or in any combination.

Depending on the particular sweetness release profile and shelf-stability needed, coated or uncoated high-intensity sweeteners may be used in the chewing gum composition. High-intensity sweeteners, such as aspartame, may be used at levels from about 0.01% to about 3.0%. Encapsulated aspartame is a high intensity sweetener with improved stability and release characteristics, as compared to free aspartame. Free aspartame can also be added, and a combination of some free and encapsulated aspartame may be used.

Flavors contemplated by the present invention include any liquid flavoring which is of food acceptable quality. The flavor may comprise essential oils, synthetic flavors, or mixtures thereof, including but not limited to oils derived from plants and fruits such as citrus oils, fruit essences, peppermint oil, spearmint oil, clove oil, oil of wintergreen, anise, and the like. Artificial flavoring components are also contemplated by the present invention. Those of ordinary skill in the art will recognize that natural and artificial flavors may be combined in any sensorially acceptable blend. All such flavors and blends are contemplated by the present invention.

Flavors may be present in the chewing gum in an amount within the range of from about 0.1% to about 10%, and typically constitute from about 0.5% to about 3.0% of the gum.

Optional ingredients such as colors, emulsifiers and pharmaceutical agents may also be added as separate components of the chewing gum composition, or added as part of the gum base.

Aqueous syrups, such as corn syrup and hydrogenated corn syrup may be used, particularly if their moisture content is reduced. This can typically be done by coevaporating the aqueous syrup with a plasticizer, such as glycerin or propylene glycol, to a moisture content of less than 10%. Typical compositions include hydrogenated starch hydrolysate solids and glycerin. Such syrups and their methods of preparation are discussed in detail in U.S. Pat. No. 4,671, 967, incorporated herein by reference.

A method of manufacturing chewing gum according to the present invention is by sequentially adding the various chewing gum ingredients to any commercially available mixer known in the art. After the ingredients have been thoroughly mixed, the gum base is discharged from the mixer and shaped into the desired form such as by rolling into sheets and cutting into sticks, extruding into chunks, or casting into pellets.

Generally, the ingredients are mixed by first melting the gum base and adding it to the running mixer. The base may also be melted in the mixer itself. Color or emulsifier may also be added at this time. A softener such as glycerin may be added at this time, along with syrup and a portion of the bulking agent. Further portions of the bulking agents may be added to the mixer. Flavor is typically added with the final portion of the bulking agent. Other optional ingredients are added in the batch in a typical fashion, well known to those of ordinary skill in the art.

The coating may contain ingredients such as flavoring agents, artificial sweeteners and dispersing agents, coloring agents, film formers and binding agents. Flavoring agents contemplated by the present invention include those commonly known in the art such as essential oils, synthetic flavors or mixtures thereof, including but not limited to oils derived from plants and fruits such as citrus oils, fruit essences, peppermint oil, spearmint oil, other mint oils, clove oil, oil of wintergreen, anise and the like. The flavoring agents may be added to the coating syrup in an amount such that the coating will contain from about 0.2% to about 1.2% flavoring agent, and typically constitute from about 0.7% to about 1.0% flavoring agent.

Artificial sweeteners, particularly high-intensity sweeteners, contemplated for use in the coating include but are not limited to synthetic substances, saccharin, thaumatin, alitame, saccharin salts, aspartame, sucralose and acesulfame-K. The artificial sweetener may be added to the coating syrup in an amount such that the coating will contain from about 0.05% to about 1.0%, and typically from about 0.10% to about 0.5%, artificial sweetener.

Dispersing agents are often added to syrup coatings for the purpose of whitening and tack reduction. Dispersing agents contemplated by the present invention to be employed in the coating syrup include titanium dioxide, talc, or any other antistick compound. The dispersing agent may be added to the coating syrup in amounts such that the coating will contain from about 0.1% to about 1.0%, and typically from about 0.3% to about 0.6%, of the agent.

Coloring agents may be added directly to the syrup in the dye or lake form. Coloring agents contemplated by the present invention include food quality dyes. Film formers that may be added to the syrup include methyl cellulose, hydroxypropyl cellulose, ethyl cellulose, hydroxyethyl cellulose, carboxymethyl cellulose and the like and combinations thereof. Binding agents may be added either as an initial coating on the chewing gum center or may be added directly into the syrup. Binding agents contemplated by the present invention include gum arabic, gum talha, gelatin, vegetable gums and the like. The binding agents, when added to the coating syrup, are typically added at a level of between about 0.5 and 10%.

Preferably, the coating process is carried out in a rotating pan. Gum center tablets to be coated are placed into the rotating pan to form a moving mass. The material or syrup which will eventually form the coating is applied or distributed over the gum center tablets. Flavoring agents may be added before, during and after applying the syrup to the gum centers. Once the coating has dried to form a hard surface, additional syrup additions can be made to produce a plurality of coatings or multiple layers of hard coating.

In the hard coating panning procedure, syrup is added to the gum center tablets at a temperature range of from about 100° F. to about 200° F. Alternatively, the syrup temperature may be from about 120° F. to about 170° F. The syrup temperature may be maintained throughout the process at a temperature so as to prevent the polyol in the syrup from crystallizing. For hydrogenated isomaltulose suspension syrups, the syrup temperature will generally be maintained at about 130–136° F. The syrup may be mixed with, sprayed upon, poured over, or added to the gum center tablets in any way known to those skilled in the art.

Each component of the coating on the gum center tablets may be applied in a single hard layer or in a plurality of hard layers. In general, a plurality of layers is obtained by applying single coats, allowing the layers to dry, and then repeating the process. The amount of solids added by each coating step depends chiefly on the concentration of the coating syrup. Any number of coats may be applied to the gum center tablet. Typically, about 30 to about 60 coats may be applied. In any event, a sufficient number of coats are applied to yield a hard coated chewing gum or other comestible product, typically containing about 10% to about 65% coating. For chewing gum, the final product may contain from about 20% to about 50% hard coating.

Those skilled in the art will recognize that in order to obtain a plurality of hard coated layers, a plurality of premeasured aliquots of coating syrup may be applied to the gum center tablets. It is contemplated, however, that the volume of aliquots of syrup applied to the gum center tablets may vary throughout the coating procedure.

The present invention contemplates that a flavoring agent may be added to the syrup, or applied to the gum center tablets while the syrup coating is drying or after the coating has dried. Furthermore, the flavoring agent may be applied anywhere within the sequence of coats, for example, after the third, twelfth, eighteenth, etc., coats.

Once a coating of syrup is applied to the gum center tablets, the present invention contemplates drying the wet syrup in an inert medium. A preferred drying medium comprises air. Typically, forced drying air contacts the wet syrup coating in a temperature range of from about 75° to about 115° F. Usually, drying air in the temperature range of from about 80° to about 100° F. may be used. Typically, the drying air possess a relative humidity of about 5–25%.

The drying air may be passed over and admixed with the syrup coated gum centers in any way commonly known in the art. The drying air may be blown over and around the syrup coated gum center at a flow rate, for large scale operations, of about 2800 cubic feet per minute. If lower quantities of material are being processed, or if smaller equipment is used, lower flow rates would be used. If a flavoring agent is applied after a syrup coating has been dried, the present invention contemplates drying the flavoring agent with or without the use of a drying medium.

The present invention may use a dry charging step along with the use of the suspension syrup in the coating process. Dry charging is used to reduce stickiness of the syrup applications. Generally at least five alternating steps of applying a first coating syrup then a powder material are used, and 10 alternating steps may be used. An important part of this first stage of the coating process is that the first coating syrup completely cover the centers, and then applying powder material in sufficient quantity to make a smooth coating.

In another embodiment of the present invention, the inventive syrup suspension may be used in the coating process without the need for a dry charge. As noted earlier, a dry charge is generally used to help dry the liquid application and reduce sticking of the pellets together or to the side of the coating pan during the coating operation. Other methods to reduce sticking during coating are to significantly reduce the amount of liquid coating applied per application and use more drying air and longer dry times. Also, a finishing syrup may be used in the latter stages of coating if a smoother product is desired. Of course, this overall coating process will substantially increase the length of coating time and reduce overall productivity. However, the inventive syrup suspension should still yield the improved product characteristics.

The suspension syrup is used to allow for the addition of a large amount of solids in each coating step. In prior art coating operations, suspension syrups have been used to apply hydrogenated isomaltulose coatings. These suspension coatings generally have a solids content of about 65% to 72% solids. A suspension syrup composition found in the prior art is reported in Silesia Confiserie Manual No. 4, revised edition, as follows:

TABLE I

| | |
|---|---|
| Water | 29.0% |
| Hydrogenated Isomaltulose | 43.65% |
| Titanium Dioxide | 1.0% |
| 50% Gum Talha Solution | 4.1% |
| Powder Hydrogenated Isomaltulose | 22.15% |
| High-Intensity Sweetener | 0.1% |
| Total | 100% |

Another typical coating suspension syrup is shown in the following Table II:

TABLE II

| | |
|---|---|
| Water | 24.1% |
| Hydrogenated Isomaltulose | 42.5% |
| Titanium Dioxide | 0.9% |
| 40% Gum Talha Solution | 5.5% |
| Powder Hydrogenated Isomaltulose | 26.5% |
| High-Intensity Sweetener | 0.4% |
| Color | 0.1% |
| Total | 100% |

This syrup contains a calculated moisture of 27.4%, or about 73% solids.

This syrup, when coated onto gum, takes about 4 to 5 hours of applying syrup, dry charging, and drying to get an increase in piece weight due to coating of about 33%.

During development of the present invention, a number of different coating syrups and suspensions were investigated, including the use of enriched and non-enriched hydrogenated isomaltulose materials. It was found that if a suspension syrup using a combination of different hydrogenated isomaltulose materials were used, an improved coating could be produced. Particularly it was found that a suspension syrup made with 1) a solution of hydrogenated isomaltulose that was enriched to contain an excess amount of GPS compared to GPM and 2) a powder forming a solid suspension in the syrup, the powder comprising hydrogenated isomaltulose that is not enriched in GPS compared to GPM, gave good results. The GPS to GPM ratio of the enriched hydrogenated isomaltulose used in the solution part of the coating syrup of the present invention will generally be between about 99:1 and about 60:40, and may be about 80:20. It is believed that a syrup with 100% GPS in solution and a powder in suspension with the powder containing both GPS and GPM would also produce a suitable coating. It is also believed that a hydrogenated isomaltulose enriched in GPM may be used for the powder which forms the suspension in a suspension syrup. One embodiment of the invention uses a combination of ISOMALT GS solution blended with ISOMALT ST powder to form a suspension, and uses that suspension throughout the coating process. In addition, dry charging with ISOMALT ST was found to be effective. It has been discovered that this coating formulation and process gives an improved pellet crunch compared to using ISOMALT GS only in the coating or using ISOMALT ST only in the coating. It has been found that a blend of ISOMALT GS with ISOMALT ST dries faster than an all ISOMALT GS coating. The blend also gives a faster development of crunch than the all ISOMALT GS coating. This may be due to the GPS fraction being more soluble than GPM. An all ISOMALT ST coating has poor crunch and poor shelf life.

Following are compositions for the two syrups used in the preferred embodiment of the invention:

TABLE III

| | Suspension Syrup, % | Finishing Syrup, % |
|---|---|---|
| Water | 20.6 | 28.0 |
| Isomalt GS Powder | 48.2 | 65.4 |
| Titanium Dioxide | 0.9 | 0.9 |
| 40% Gum Talha Solution | 5.7 | 5.2 |
| Isomalt ST Powder | 24.0 | — |
| High-Intensity Sweetener | 0.5 | 0.4 |
| Color | 0.1 | 0.1 |
| | 100.0 | 100.0 |
| Calculated Moisture Content | 24.1% | 31.1% |
| Total % solids | 75 | 69 |

For the suspension syrup, a total solids of about 68% to about 78% solids may be used. Preferably, about 70% to about 76% solids may be used, and about 72% to about 75% solids may also be used. For the finishing syrup, a total solids of about 66% to about 72% may be used. Preferably, about 67% to about 71% solids may be used, and about 69% solids may also be used. The finishing syrup may contain about 55% to about 70% hydrogenated isomaltulose. The suspension syrup may contain about 60% to about 75% hydrogenated isomaltulose. The suspension syrup may be used throughout the entire coating process. Optionally, the finishing syrup may be used to finish the coating process to obtain a smoother product.

A finishing syrup may be prepared as a solution by dissolving ISOMALT GS powder into water at about 90° C., adding the other ingredients, and reheating and holding at 70° C. until used for coating. A suspension syrup may be prepared by dissolving ISOMALT GS powder in water heated to 90° C. to make a solution. The solution is then cooled with the addition of the gum talha solution and other ingredients to about 55° C. (131° F.). Powdered ISOMALT ST is added to form a suspension. This mixture is then held at 55° C. for coating. The powdered hydrogenated isomaltulose may have a particle size such that 90% of the material is less than 100 microns. A suspension syrup of about 72% solids may be used throughout the coating process without the use of a finishing syrup.

EXAMPLES

The invention will now be illustrated with Examples, which are not to be construed as imposing limitations on the invention.

The following gum formulas were made into pellets for coating:

| Gum Composition | A % | B % |
|---|---|---|
| Base | 32.0% | 31.34% |
| Sorbitol | 39.52 | 35.87 |
| Calcium Carbonate | 15.0 | 11.6 |
| Glycerin | 0.75 | 2.0 |
| Encapsulated APM | 0.87 | 0.87 |
| Liquid Sorbitol | 7.5 | 4.0 |

-continued

| Gum Composition | A % | B % |
|---|---|---|
| Encapsulated Flavor | 2.0 | 2.0 |
| Flavor | 2.36 | 2.36 |
| Mannitol | — | 9.96 |
| Total | 100.0 | 100.00 |

All coating examples were made on a Driam Driacoater Model DRC1200 using a center load of 60 Kg. Pellets are coated with about 40 to 50 syrup spray applications with drying between each application. Air drying conditions were about 30° C. and about 25% RH. Dry charging was done within the first 10–22 applications, and flavor was added in several of the next 20–30 applications. Coating was applied to pellets that weigh about 1.04 grams per piece until a piece weight of 1.52 grams per piece was obtained, which is a 31.5% coating. Pellets were then polished with carnauba wax.

Comparative Example A

Standard gum coating procedures were followed for preparation of the syrup with standard hydrogenated isomaltulose (ISOMALT ST) as described previously. The formulation of the hydrogenated isomaltulose syrup for Example A is described in Table II. Gum talha was premixed in water to give a 40% solution and mixed into the hydrogenated isomaltulose solution. The hydrogenated isomaltulose syrup suspension was prepared by dissolving hydrogenated isomaltulose in water and heating to 85° C. The gum talha solution, titanium dioxide, and high-intensity sweetener were added. This cooled the syrup to 55° C. The hydrogenated isomaltulose powder and color were added to give a hydrogenated isomaltulose syrup suspension. The syrup was then used to coat the gum centers of composition A using the above procedure to increase piece weight from a center of 1.04 grams to a final weight of 1.52 grams per piece. About 36 applications of hydrogenated isomaltulose suspension syrup were applied, with another five applications of a thin hydrogenated isomaltulose finishing syrup. As a dry charge, 0.23 Kg of powder hydrogenated isomaltulose was added at each of the first 15 syrup applications and 0.1 Kg flavor was added after each of another six applications of suspension syrup.

Comparative Example B

Standard gum coating procedures were followed for preparation of the syrups according to the composition found in Table III, but with ISOMALT GS used for both powders. No ISOMALT ST was used in this example. Gum composition B was made into pellets for coating. Gum talha was premixed in hot water to give a 40% solution used in both syrups. Both the suspension and finishing syrups were prepared by dissolving ISOMALT GS in water and heating to 85° C. The gum talha solution, titanium dioxide and high intensity sweetener were added. This cooled the syrups to about 55° C. The ISOMALT GS powder and color were added to form the suspension syrup. Only color was added to complete the finishing syrup. The suspension syrup was used in the first 36 syrup applications, and 0.23 Kg of powder ISOMALT GS powder was added after each of the first 13 applications. Flavor was added at 0.1 Kg after each of another six applications of the suspension syrup. The finishing syrup was then applied for the final five applications to give the desired piece size of 1.52 grams.

Inventive Example 1

This gum example was coated by the inventive formulation and process described above. Gum composition B was made into pellets for coating. The formulation for the suspension syrup is shown in Table III. In this example, ISOMALT GS powder was used to make the aqueous syrup by dissolving ISOMALT GS in water and heating to 85° C. Gum talha was premixed in hot water to give a 40% solution and mixed into the syrup. Titanium dioxide and high intensity sweetener were added along with the gum talha solution. This cooled the syrup to about 55° C. The ISOMALT ST powder and color were added to form the suspension syrup. The suspension syrup was used in all of 42 syrup applications, with 0.23 Kg of powder ISOMALT ST added after each of the first 22 applications. Flavor was added at 0.1 Kg after each of another six applications of the suspension syrup. The suspension syrup was applied even in the finishing applications to give the desired piece size of 1.52 grams.

After the examples were three weeks old, a formal sensory test of six people was conducted to describe sensory differences. All of the samples had the same sensory flavor profile. The major difference was initial pellet crunch. Crunch is described to be the friability and fracturability of the coating of pellet chewing gum. A moderate to high level of crunch that is normally obtained from sugar coated gum is considered most desirable. Comparative Example A had very low perceived pellet crunch. Comparative Example B had low to moderate crunch and Inventive Example 1 had a moderate crunch, the highest level of crunch of all three samples tested. These results indicate that the inventive formulation and process gives improved sensory properties for coated products.

A wide range of changes and modifications to the embodiments of the invention described above will be apparent to persons skilled in the art. For example, while the invention is described with respect to hard-coated chewing gum, it will be appreciated that the coating process is applicable to coating other food products, such as candies, in which a hydrogenated isomaltulose coating would have utility.

It will be appreciated that the addition of some other ingredients, process steps, materials or components not specifically included will have an adverse impact on the present invention. The best mode of the invention may therefore exclude ingredients, process steps, materials or components other than those listed above for inclusion or use in the invention.

It should be appreciated that the compositions and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive, and the scope of the invention, therefore, is indicated by the appended claims rather than by the foregoing description. All changes which come within the meaning and range of equivalency of the claims are to be embraced within their scope.

We claim:

1. A method of coating comestibles comprising the steps of:
    a) providing cores of comestible material to be coated;
    b) applying a coating syrup to the cores, the coating syrup comprising a suspension of
        i) an aqueous solution of hydrogenated isomaltulose enriched in alpha-D-glucopyranosido-1,6-sorbitol (GPS) compared to alpha-D-glucopyranosido-1,1-mannitol (GPM), and
        ii) a powder of hydrogenated isomaltulose that is not enriched in GPS compared to GPM;
    c) evaporating water from the applied coating syrup; and
    d) repeating steps b) and c) to build up a layer of coating on the cores.

2. The method of claim 1 wherein a hard, crunching coating is formed on the comestible.

3. The method of claim 1 wherein the coating syrup further comprises a high-intensity sweetener.

4. The method of claim 1 wherein the comestible cores comprise chewing gum.

5. The method of claim 1 wherein the coating syrup comprises between about 68% and about 78% total solids.

6. The method of claim 1 wherein the coating syrup comprises between about 70% and about 76% total solids.

7. The method of claim 1 wherein the coating syrup comprises between about 72% and about 75% total solids.

8. The method of claim 1 wherein the coating syrup comprises a binding agent selected from the group consisting of gum arabic, gum talha, gelatin, vegetable gums and mixtures thereof.

9. The method of claim 8 wherein the coating syrup comprises between about 0.5% and about 10% of said binding agent.

10. The method of claim 1 wherein the hydrogenated isomaltulose in powder form has essentially equal amounts of GPS and GPM.

11. The method of claim 1 wherein the hydrogenated isomaltulose dissolved in solution has a ratio of GPS to GPM of between about 99:1 and about 60:40.

12. The method of claim 1 wherein the coating syrup is applied at a temperature of between about 130° F. and about 136° F.

13. A method of coating comestibles comprising the steps of:
    a) providing cores of comestible material to be coated;
    b) applying a first coating syrup to the cores;
    c) applying a powder material over the first coating syrup;
    d) repeating steps b) and c) to build up a first layer of coating on said cores;
    e) wherein the first coating syrup is a suspension made from:
        i) a solution of hydrogenated isomaltulose that is enriched in containing an excess amount of alpha-D-glucopyranosido-1,6-sorbitol (GPS) compared to alpha-D-glucopyranosido-1,1-mannitol (GPM) and
        ii) a powder forming a solid suspension in the syrup, the powder comprising hydrogenated isomaltulose that is not enriched in GPS compared to GPM.

14. The method of claim 13 wherein after the first layer of coating has been built up, step b) is repeated without step c) to form a second layer of coating.

15. The method of claim 14 further comprising the step of applying a second coating syrup over said second layer of coating to form a smooth finish layer.

16. The method of claim 15 wherein the second coating syrup comprises between about 66% and about 72% hydrogenated isomaltulose.

17. The method of claim 15 wherein the second coating syrup comprises between about 67% and about 71% hydrogenated isomaltulose.

18. The method of claim 13 wherein the powder material used over the first coating syrup comprises hydrogenated isomaltulose.

19. A method of coating comestibles comprising the steps of:
 a) providing cores of comestible material to be coated;
 b) applying a coating syrup to cover the cores, the syrup comprising between about 0.5% and about 10% of a binding agent and a suspension of
  i) an aqueous solution of hydrogenated isomaltulose that has both GPS and GPM, with a ratio of GPS to GPM of between about 99:1 and about 60:40 and
  ii) a powder of hydrogenated isomaltulose suspended in the solution, the powder having both GPS and GPM, with the amount of GPS not exceeding the amount of GPM;
 c) applying a powdered material over the coating syrup, the powdered material comprising hydrogenated isomaltulose;
 d) repeating steps b) and c) to build up a first layer of coating on the cores; and
 e) applying the boating syrup over the first layer of coating, drying the coating syrup and then continuing this procedure in repeated applications to form a second coating layer on the cores, the second coating layer being formed without applying the powdered material used in step c) between applications of the coating syrup used to form said second layer.

20. The method of claim 19 wherein the powdered material used in step c) comprises hydrogenated isomaltulose that is enriched to have more GPS than GPM.

21. The method of claim 19 wherein the coating syrup has a total solids content of between about 68% and about 78%.

22. The method of claim 19 wherein the ratio of GPS to GPM in the aqueous solution is about 80:20.

* * * * *

UNITED STATES PATENT AND TRADEMARK OFFICE
CERTIFICATE OF CORRECTION

PATENT NO.     : 6,444,240 B1
DATED          : September 3, 2002
INVENTOR(S)    : David C. Barkalow et al.

It is certified that error appears in the above-identified patent and that said Letters Patent is hereby corrected as shown below:

Column 14,
Line 3, delete "boating" and substitute -- coating -- in its place.

Signed and Sealed this

Fourteenth Day of October, 2003

JAMES E. ROGAN
*Director of the United States Patent and Trademark Office*